United States Patent [19]

Sakurai

[11] 4,409,861
[45] Oct. 18, 1983

[54] DIAL TYPE WIRE CONTROL DEVICE

[75] Inventor: Yukio Sakurai, Yokohama, Japan

[73] Assignee: Nissan Motor Co., Ltd., Kanagawa, Japan

[21] Appl. No.: 216,311

[22] Filed: Dec. 15, 1980

[30] Foreign Application Priority Data

Dec. 17, 1979 [JP] Japan .................. 54-173418

[51] Int. Cl.³ .............. F16C 1/10; G05G 1/08; G05G 1/04
[52] U.S. Cl. .................. 74/501 R; 74/506; 74/517; 74/531
[58] Field of Search ............. 74/506, 501 R, 517, 74/531

[56] References Cited

U.S. PATENT DOCUMENTS

| 462,993 | 11/1891 | Pfetch | 74/506 |
| 473,553 | 4/1892 | Harrison | 74/517 |
| 1,457,260 | 5/1923 | Mason | 74/501 |
| 2,276,935 | 3/1942 | Como | 74/501 |
| 2,480,865 | 9/1949 | Lofstrand | 74/517 |
| 3,000,231 | 9/1961 | Cochran | 74/502 |
| 3,160,027 | 12/1964 | Waner | 74/501 |
| 4,266,440 | 5/1981 | Berens | 74/501 R |

Primary Examiner—Kenneth Dorner
Assistant Examiner—L. D. Shannon, III
Attorney, Agent, or Firm—Schwartz, Jeffery, Schwaab, Mack, Blumenthal & Koch

[57] ABSTRACT

A dial type wire control device includes a drum and a strap or band in combination. The drum is connected to a dial member through a connecting shaft so that the drum and the dial member can rotate synchronously. The band is to be wound on the periphery of the drum when the drum rotates in one direction and to be unwound when it rotates in the opposite direction. Thus, the wire is pulled or pushed to control a subject in a conventional manner.

5 Claims, 5 Drawing Figures 4,409,861

1

DIAL TYPE WIRE CONTROL DEVICE

BACKGROUND OF THE INVENTION

This invention relates to a dial type wire control device in which a dial member rotates to drive a subject driven member by means of a wire.

FIG. 1 shows a conventional dial type wire control device. A dial member 1 is fixed to one end of a shaft 2. The other end of the shaft 2 is fixed to a pinion gear 3, like a bevel gear. The pinion gear 3 engages a fan shaped rack gear 4 which can rotate around a point 4a within a given range. A wire 5 is connected at one end to one end of the rack 4 and at its other end to a subject driven member (not shown). In operation, the roatation of the dial member 1 urges the rack 4 to rotate around the point 4a, whereby the wire 5 is pulled or pushed to actuate the subject driven member.

In such a conventional dial type wire control device, however, as the rotation of the dial member is transmitted to the rotation of the rack, a large space is necessary for rotation of the rack. Thus, such a conventional device can not be provided within a limited space. Also, because the input angle of the dial member 1 has a rectilinear relation with the output stroke of the wire 5, for example, when such a conventional device is applied to a blown-air temperature control system for a heater, the actual temperature of the blown-air does not change in strict correspondence with the input angle of the dial member, that is, the output stroke of the wire. Thus, a precise temperature control can not be obtained.

SUMMARY OF THE INVENTION

According to the present invention, a dial type wire control device includes in combination, a drum and a strap or band, in place of a pinion and rack combination. The drum is fixedly connected to a dial member by means of a connecting shaft so that the drum and the dial member can rotate synchronously in the same direction. The band is to be wound on the peripheral surface of the drum. The moving stroke of a wire is controlled by such a drum and band combination. One end of the wire is connected to one end of the band, and the other end of the wire is connected to a subject driven member.

It is preferable that the configuration of the periphery of the drum be so designed to obtain a variety of relationships between the input angle of the dial member and the output stroke of the wire.

Accordingly, it is an object of the present invention to provide a dial type wire control device in which only a small space is required for the purpose of attaching the wire control device.

A further object of the present invention is to provide a dial type wire control device in which a variety of transmitting modes between an input angle of the dial member and an output stroke of the wire can be obtained.

BRIEF DESCRIPTION OF THE DRAWINGS

These and other objects, features and advantages of the present invention will become more apparent from the following description of two preferred embodiments thereof when taken in conjunction with the accompanying drawings in which.

DETAILED DESCRIPTION OF THE PREFERRED EMBODIMENTS

Figure 1:
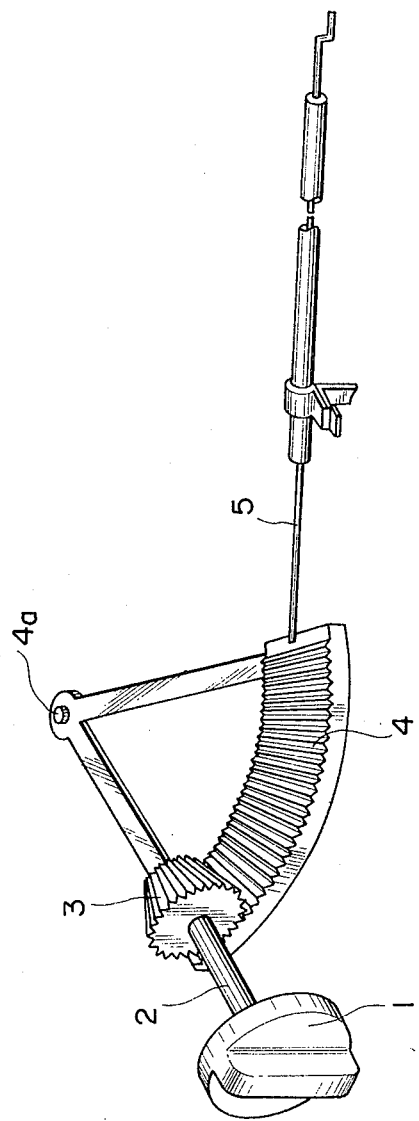
FIG. 1 is a diagrammatical perspective view showing a conventional dial type wire control device.
Figure 2:
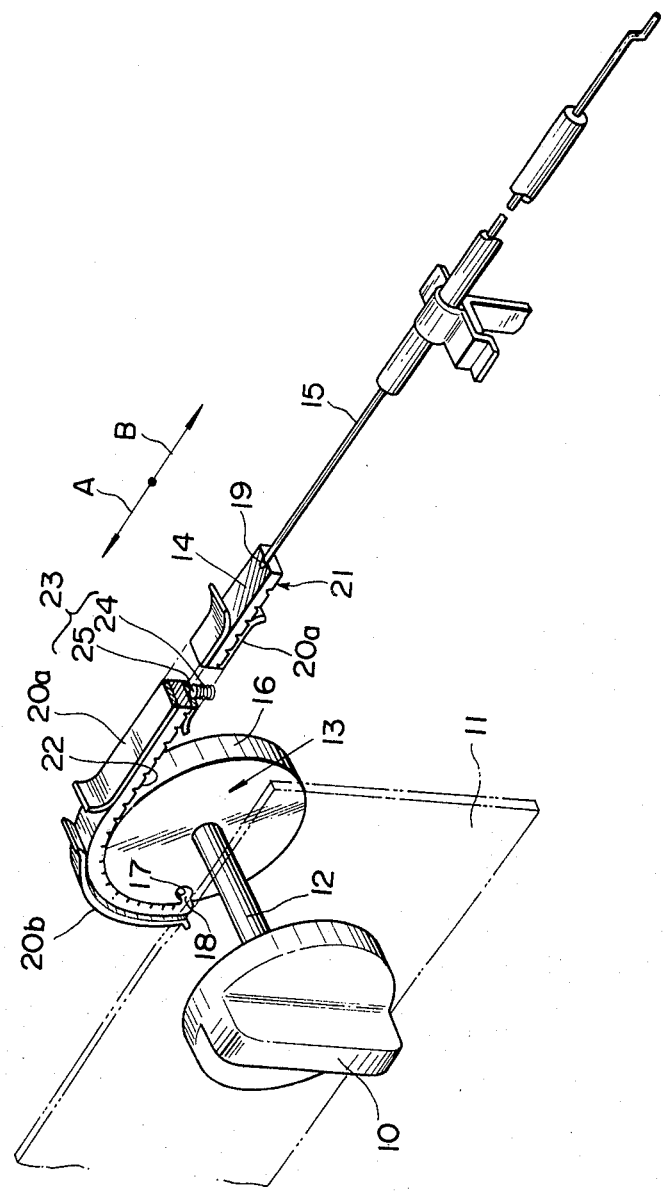
FIG. 2 is a diagrammatical perspective view showing a dial type wire control device according to a first embodiment of the present invention.

Referring now to FIG. 2, a temperature dial member 10 for blown-air temperature control of a heater (not shown) is rotatably provided to a heater control finisher 11 through a shaft 12. One end of the shaft 12 is fixed to the center of the dial member 10, and the other end of the shaft 12 is fixed to the center of a drum 13. A strap or band 14 is to be wound on the periphery 16 of the drum 13. A wire 15 is connected at one end to the outer end of the band 14 and at its other end to a driven subject member (not shown) such as a temperature control door in such a way that the stroke of the wire is adjusted to control the subject member.

The dial member 10 and the drum 13 are fixed to the common shaft 12 in such a manner that they can rotate integrally at the same time in the same direction. The periphery 16 of the drum 13 is circular. A notched portion 17 is formed on the periphery 16 of the drum 13 to receive fixedly the inner end of the band 14.

The band 14 is made of a flexible material such as a polypropylene or the like. The band 14 has at its inner end a projection 18 which is fixed in the notched portion 17 of the drum 13. Also, the band 14 has at its other end an opening 19 into which said one end of the wire 15 is fixed. As rotation of the drum 13 proceeds, the band 14 is wound onto the periphery 16 of the drum 13. When the drum 13 rotates in the opposite direction, the band 14 is gradually unwound from the drum 13. As a result of winding or unwinding the band 14, the stroke of the wire 15 changes.

When the band 14 moves, it is retained on the drum periphery by means of guide plates 20a and 20b which face the drum 13. In particular, the guide plate 20b functions to prevent the band 14 from buckling when the band 14 is unwound from the drum 13.

A plurality of indentations 22 are formed on the inner face 21 of the band 14 which directly engages the periphery 16 of the drum 13. Such indentations 22 are positioned at regular intervals and run across the band 14 or in its width direction through the full length of the band 14. Locking means 23 is adapted to engage such indentations 22 to lock the band 14 in position if desired. The locking means 23 includes a coil spring 24 set on the lower part of the guide plate 20a and a ball 25 biased toward the band 14 by the force of the spring 24 so that the ball 25 is urged to protrude from the lower part of the guide plate 20a against the inner face of the band 14. Thus, the ball 25 can engage such indentations 22 to stop or lock the band 14 to some extent. The locking force of the locking means 23 permits the band 14 to stop except when the dial member 10 is rotated by hand. In other words, when the dial member 10 is forcibly rotated, the ball 25 of the locking means 23 is released from the indentations 22 so that the band 14 can move forwardly or backwardly against the biasing force of the spring 24.

In addition, the indentations 22 serve as relief grooves to permit the band 14 to more easily flex as it is wrapped around the drum 16.

The present invention is not limited to such a mode of locking means. Any other means can be used if the band 14 can be locked in a desired position and released if required.

The operation of the wire control device of the present invention will be explained as follows:

When the dial member 10 is rotated clockwise or counterclockwise, the drum 13 rotates synchronously in the same direction as the dial member 10. As a result, the band 14 is wound onto or unwound from the periphery 16 of the drum 13 so that the outer end of the band 14 connected to the wire 15 moves in the direction A or B shown in FIG. 2. At the same time, the wire 15 moves in the direction A or B. Such a moving stroke of the wire 15 is transmitted to the driven subject member (not shown) in a conventional manner.

When the band 14 is unwound from the drum 13, the guide plate 20b regulates the movement of the band 14, functioning to prevent the band 14 from buckling. Thus, the band 14 can move smoothly. When handling of the dial member 10 stops, the locking means 23 locks the band 14 in position.

When the dial member 10 is again rotated by hand, for example, the locking means 23 can be easily released so that the band 14 can move.

Accordingly, only a small space is required to change the input of the temperature dial into the stroke movement of the wire. It is very convenient and useful.

Figure 3:
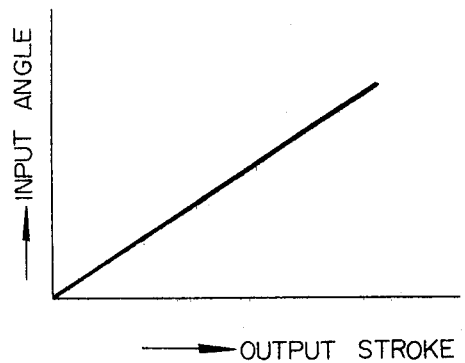
FIG. 3 is a graph showing the relationship between the input angle of a dial member and the output stroke of a wire according to the first embodiment as shown in FIG. 2.

As shown in FIG. 3, according to the present invention, the relation between the input angle of the temperature dial and the output stroke of the wire is linear.

Figure 4:
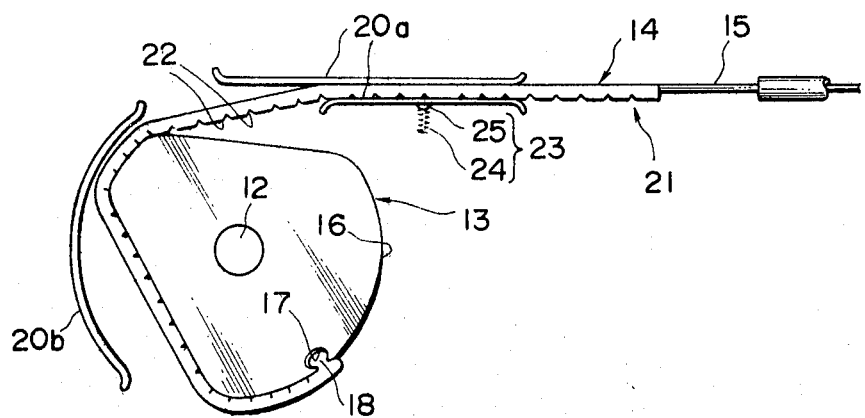
FIG. 4 is a diagrammatic side view showing a dial type wire control device according to a second embodiment of the present invention.

FIG. 4 shows a second embodiment of the present invention. Through the figures, like references designate the same or corresponding elements or parts.

In the second embodiment, the periphery 16 of the drum 13 is not circular, but includes two straight portions and one curved portion. The connecting parts therebetween are round as shown in FIG. 2. Due to such configuration of the periphery 16 of the drum 13, the input angle of the temperature dial is not in linear relation to the output stroke of the wire 15. The relation therebetween is so designed that the actual change of the air temperature coming from the heater can correspond to the input angle of the temperature dial. For example, such a configuration of the periphery 16 of the drum 13 can be determined on the basis of experiments by feedback by taking into consideration the change of the output stroke thereof.

Figure 5:
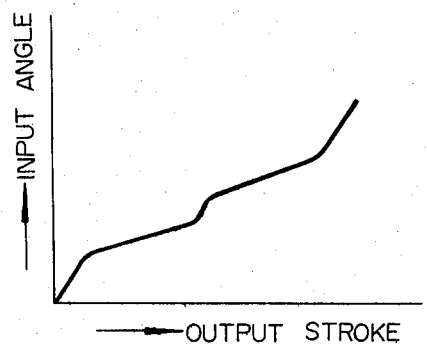
FIG. 5 is a graph showing the relationship between the input angle of a dial member and the output stroke of a wire according to the second embodiment as shown in FIG. 4.

FIG. 5 shows the relation between the input angle of the drum and the output stroke of the wire in the second embodiment. It changes step by step.

The configuration of the periphery of the drum can be designed in any manner in order to obtain a desired relation between the input angle of the temperature dial and the output stroke of the wire. This results in the precise control of the temperature or other device being controlled by the wire 15.

According to the present invention, as can be seen from the foregoing, the desired space for a wire control device can be minimized so that the device can be provided in any place regardless of strict space limitations. Also, because the members have no gear portion engaged with each other, they can be easily made of a synthetic resin. It results in a light-weight structure, simplicity in manufacture, and reduced manufacturing costs.

In addition, a precise control of, for instance, a temperature can be obtained because the periphery of the drum can be freely designed in view of the actual values of the subject matter.

What is claimed is:

1. A dial type wire control device for controlling a subject, comprising:
    a dial member;
    a drum;
    means for connecting the dial member with the drum so that the dial member and the drum can rotate synchronously;
    a wire having one end thereof connected to the subject; and
    a flexible strap or band having one end thereof connected to the other end of the wire, the other end of the band being fixed to an outer peripheral portion of the drum in such a manner that the strap or band can be wound onto the periphery of the drum when the drum rotates in one direction, and the strap or band can be unwound from the periphery of the drum when the drum rotates in the opposite direction;
    a number of indentations formed on the inner surface of the strap or band, said indentations engaging the drum;
    means positioned apart from said drum for locking the strap or band by selectively urging the locking means to be engaged with the indentations of the strap or band;
    guide means placed adjacent the periphery of the drum for guiding the strap or band in such a manner that the guide means faces the periphery of the drum to prevent the band or strap from buckling when the band or strap is unwound from the drum; and
    said indentations each running across the band for serving as relief grooves to permit the band to easily flex when it is wrapped around the drum.

2. A device of claim 1, wherein the periphery of the drum is circular.

3. A device of claim 1, wherein the periphery of the drum is non-circular.

4. A device of claim 1, wherein the periphery of the drum includes two straight portions and one curved portion which are continuous.

5. A device of claim 1, wherein said indentations are spaced at regular intervals which run laterally across the full operative length of said band or strap.

* * * * *